Dec. 1, 1936.    W. DISQUE ET AL    2,062,401
HALF TONE SCREEN OPERATING MECHANISM
Filed March 7, 1935    2 Sheets-Sheet 1

INVENTORS
William Disque & Charles E. Shelton
BY
Bidell & Thompson
ATTORNEYS

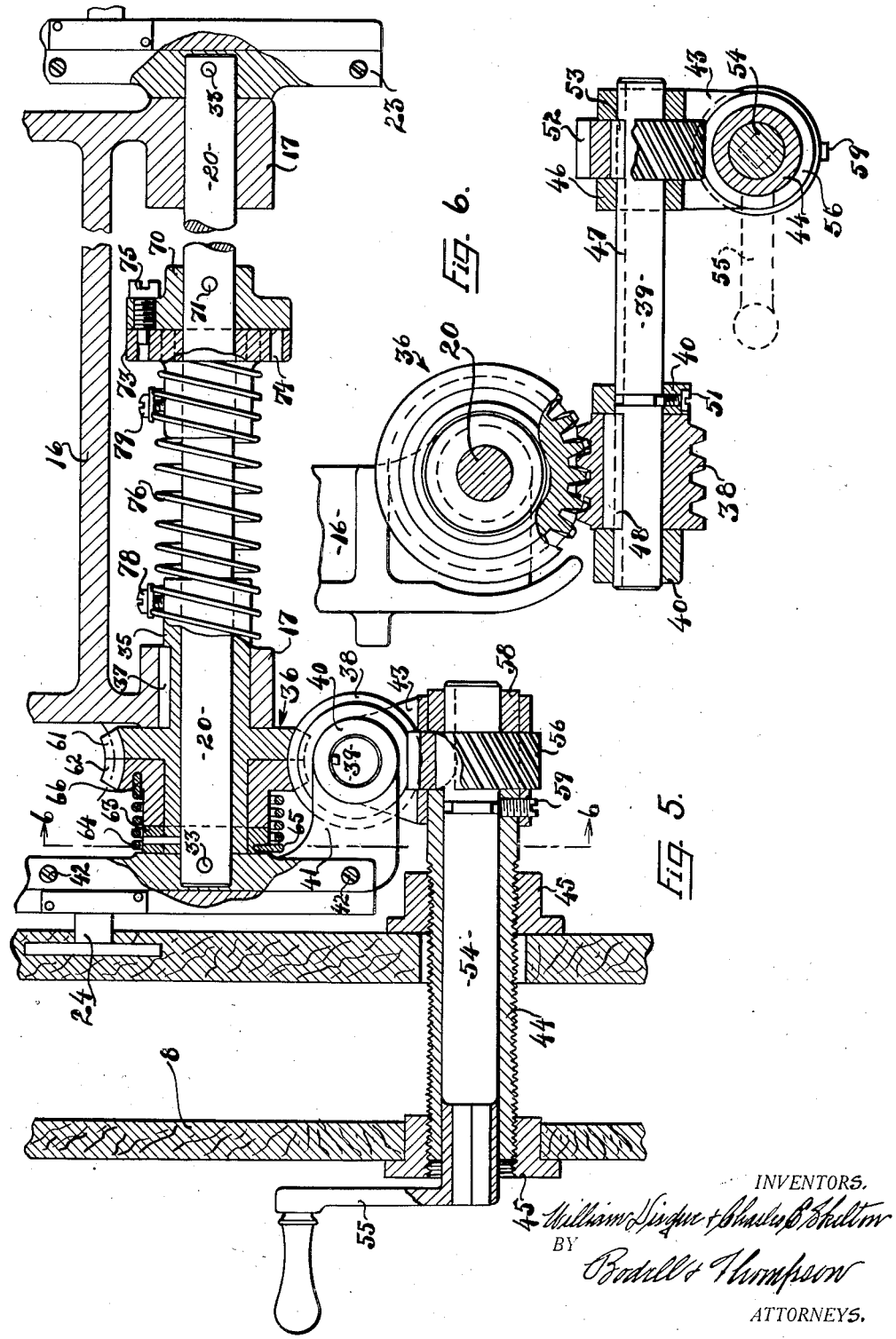

Patented Dec. 1, 1936

2,062,401

UNITED STATES PATENT OFFICE 2,062,401

HALF TONE SCREEN OPERATING MECHANISM

William Disque and Charles E. Skelton, Syracuse, N. Y.; said Skelton assignor to said Disque Application March 7, 1935, Serial No. 9,818

10 Claims. (Cl. 95—81)

This invention relates, in general, to photographic apparatus, and has reference particularly to mechanism for mounting ruled screens, commonly known as half-tone screens, and for actuating said screens into and out of register with the optical system of the camera.

The invention has as an object, a mechanism of this character which is operable from the outside of the camera to effect movement of the screen within the camera into and out of register with the photographic plate.

The invention has as a further object, a mechanism, of the type referred to, of such construction as to permit the adjustment of the screen to be made quickly and easily, and without any chattering, or vibration, during movement of the screen.

The invention has as a further object, a screen actuating mechanism of such construction as to occupy the minimum amount of space within the camera, and to act as a rigid movable support for the screen, whereby the screen operating mechanism may be installed in the ordinary process camera.

With these and other objects in view, the invention consists in the novel features and in the combinations and constructions hereinafter set forth and claimed.

In describing this invention, reference is had to the accompanying drawings in which like characters designate corresponding parts in all the views.

Figure 5 is an enlarged, sectional view of the screen frame operating mechanism and contiguous portions of the rear box of the camera.

Figure 6 is an enlarged, detail view, partly in section, of the gearing disclosed in Figure 3, the view being taken on lines 6—6, Figure 5.

Figure 1:
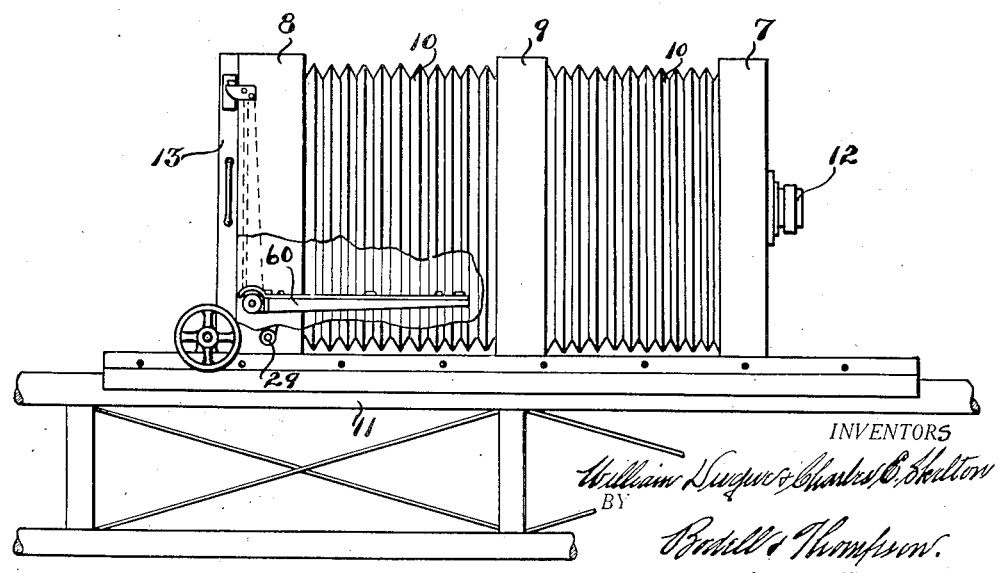
Figure 1 is a side elevation view of an ordinary process camera.

The camera, shown in Figure 1, comprises front and rear boxes 7 and 8 respectively, and an intermediate box 9. These boxes are joined together by the usual collapsible bellows 10. The camera is supported upon the usual bed member 11, and the boxes 7, 8, 9, are adjustable toward and from each other by suitable adjusting mechanism.

The front box 7 is provided with the usual lens mechanism 12, and the rear box 8 provided with a removable plate holder 13. The photographic plate is detachably mounted upon the inner side of the plate holder 13, and the lens 12 and the plate constitute the optical system of the camera.

The use of ruled screens for eliminating high dots in half-tone work, or for making a combination half-tone and line negative in one exposure, is well known to those skilled in the art. Usually, the ruled screen is inserted manually in the rear box 8 in front of the plate during one part of the exposure and then, manually removed from the rear box during the second part of the exposure. These ruled screens are formed on heavy glass, and on account of their great weight, and the necessity of preventing any light from entering the inside of the camera, it is extremely difficult to so manipulate the screens manually. These ruled screens cost a considerable amount of money and frequently, the screens become damaged, or broken, in inserting and removing them into and out of the rear box of the camera.

This invention is directed to mechanism for movably supporting the ruled screen in the rear box 8, and includes mechanism operable from the outside of the camera to move the screen, or screen carrying frame, into and out of register with the optical equipment of the camera.

The ruled screen 15 is detachably secured in a frame member 16 which is preferably of light cast metal, such as aluminum. The frame 16 is rectangular in general shape, and of such width as to clear the inner sides of the camera, or bellows 10, when moved from one position to another. As here shown, the vertical side members of the frame are formed with extension hub portions 17 which are provided with apertures to receive the horizontal transverse shaft 20, and about which the frame 16 swings, or rotates. In large process cameras, in which a ruled screen is used for half tone work, the screen is supported in a frame which is not rotatably mounted, but is supported on mechanism which is operable from the outside of the camera to adjust the frame and screen toward and from the plate holder.

Figures 2, 3, 4:
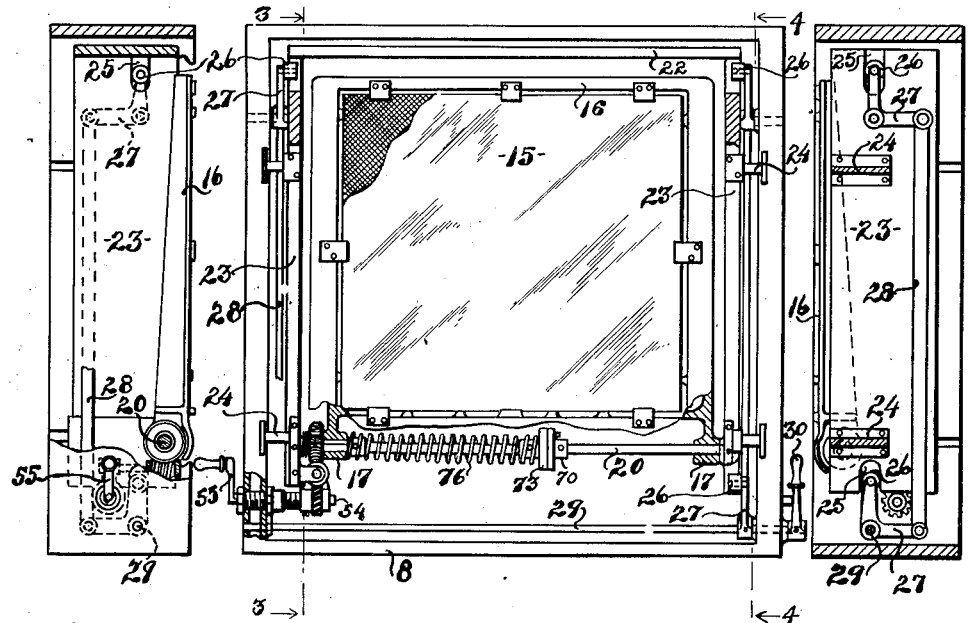
Figure 2 is an end elevation view, partly in section, looking to the right, Figure 1, with the plate holder of the camera removed.
Figure 3 is a view, taken on lines 3—3, Figure 2.
Figure 4 is a view taken on lines 4—4, Figure 2.

A type of such mechanism commonly used is shown in Figures 2, 3 and 4, and consists of a rectangular frame 22, the sides 23 of which are slidably mounted upon guides 24 extending outwardly from the vertical sides of the box frame 22. The outer ends of the guide 24 slide in recesses formed in the vertical side walls of the box 8, the guides on their inner ends being provided with a T-shaped head, as shown. Slots 25 are arranged in the side pieces 23, adjacent the respective ends thereof, to receive rollers 26 mounted on the end of the bell cranks 27. The other arms of the bell cranks 27 are connected by a link 28 whereby all of the bell cranks 27 move in unison. The lower bell cranks 27 are secured to the transverse shaft 29 and rotate about the axis thereof. The shaft 29 is rotatably mounted in the sides of the box 8 adjacent the bottom thereof and extends through one side, and is provided with an operating handle 30, upon rotation of which the bell cranks 27 are rotated and the frame 22 is moved axially of the camera, or toward and from the plate holder.

The mechanism for supporting the ruled screen frame 16, and for operating the same, is mounted on the axially adjustable frame 22, the ends of the shaft 20 being secured in the side members 23 of the frame 22 and secured from rotary movement relatively thereto, as by pins 33. As previously stated, the shaft 20 extends through the bosses 17, and the screen holder 16 is rotatable about the axis of the shaft 20. One of the bosses 17, to the right Figures 2 and 5, is apertured for a running fit on the shaft 20, and the other boss 17, to the left, is provided with a larger hole to receive the hub 35 of the worm gear section 36 and is keyed thereto as at 37. However, the hub 35 is not fixed to the shaft 20.

It will be observed, from the description thus far, that rotation of the worm gear 36 effects rotation of the frame 16 about the axis of the shaft 20.

The worm gear 36 is operated by a worm 38 keyed to a shaft 39 extending axially of the box 8 adjacent one side thereof. The end of the shaft 39, adjacent the worm 38, is rotatably mounted in bearing 40 which is formed in the nature of a bracket 41 secured to one of the vertical sides 23 of the adjustable frame 22, as by screws 42.

The other end of the shaft is supported by a bearing 43 which is carried by the inner end of a tube or sleeve 44. The sleeve 44 is threaded a substantial portion of its length, and extends through the vertical side members of the box 8, and is secured thereto by lock nuts 45 threading on the sleeve and abutting against the inner and outer faces of the side of the box 8. The sleeve 44 extends transversely of the box 8, and the bearing member 43 is provided with an aperture to receive the inner end of the sleeve 44, and is secured thereto and supported thereby. The bracket 43 is formed with upper bifurcated portions 46 which act as bearings for the forward end of the shaft 39.

The shaft 39 is provided with a keyway 47 throughout its entire length. The worm 38 is keyed to the shaft 39 as at 48, and the shaft 39 is held from endwise movement relative to the bearing member 40 by set screw 51, the end of which engages a circular recess formed in the shaft 39.

A spiral gear 52 is arranged between the bifurcations of 46 of the bearing member 43, and is slidably secured to the shaft 39 by a key 53. As previously explained, the frame member 22, to which the bearing member 40 is secured, is adjustable axially of the camera relative to the box 8. It will be observed that this axial adjustment is permitted by the shaft 39 sliding through the spiral gear 52.

A shaft 54 is rotatably mounted in the sleeve 44, the outer end of which is square, or otherwise formed to receive the operating crank 55. A spiral gear 56 is keyed to the inner end of the shaft, as at 57, and meshes with the spiral gear 52.

A sleeve or bushing 58 is pressed into the inner bifurcated portion for the bracket 43, and forms a bearing for the inner end of the shaft 54. The shaft 54 is held from endwise movement relative to the sleeve 44, and the bracket 43 is secured to the sleeve 44 by means of a screw 59, the inner end of which coacts with a circular recess formed in the shaft 54.

It will be observed that upon rotation of the crank 55, rotary motion is transmitted to the worm gear 36 through the shaft 54, spiral gears 56, 52, shaft 39, worm 38, and at the same time the screen holder frame 16 may be adjusted toward and from the plate holder of the camera, or axially of the box 11.

The ruled line screens are formed on comparatively thick glass and accordingly, are of appreciable weight which requires considerable torque on the worm gear 36 to rotate the screen holder frame 16 about its axis to move the screen from horizontal position, as indicated at 60, Figure 1, the vertical position shown in Figures 2, 3 and 4, and dotted line position Figure 1. Also, it is very important that the movement of the screen holder and screen does not cause any vibration in the camera, as such vibration is extremely detrimental to the photographic process. Means is also provided for counter-balancing the weight of the frame 16 and the ruled line screen.

As here shown, the worm gearing is provided with means for absorbing vibrations that may result from movement of the mechanism. The worm gear 36 is formed of two sections 61, 62. The section 61 is provided with an elongated hub portion 35 extending on each side thereof, and the section 62 is provided with an aperture to receive one side of the hub portion 35, and is rotatably mounted thereon. A collar 63 is keyed, or otherwise secured, to the hub 35, and one end of a helical spring 64 is secured to the collar 63 at 65. The other end of the spring is secured to the rotatable section 62 of the worm gear, as at 66. The section 62 is initially rotated, relatively to the section 61, against the action of the spring 64, and the sections 61, 62 then put in mesh with the worm 38. Due to the action of the spring 64, the sections 61, 62, tend to rotate in opposite directions, and as half of each tooth of the worm gear 36 is formed in the section 61, and the other half of the tooth formed in the section 62, the teeth of the worm gear 36 completely fill the space between the teeth of the worm 38 and prevents any relative movement, or back-lash, between the teeth. However, any vibration caused by the movement of the frame 16, and the heavy screen thereon, is absorbed by the spring 64, with the result that the frame and screen can be quickly and easily raised, or lowered, without any vibration.

The screen operating mechanism herein described, is particularly adaptable to process cameras already in use. It will be observed that the novel construction of the mechanism is such as to permit its ready installation in such cameras, and to particularly take advantage of the axial adjustment of the stationary, or non-rotatable, screen holder now incorporated in such cameras. Without interfering with the regular operation of such cameras, we have also incorporated a counter-balancing feature. This portion of the mechanism consists of a collar 70 keyed, or pinned, to the shaft 20, as at 71. A complemental collar 73 is rotatably mounted upon the shaft 20, and the flange of the collar is provided with a plurality of holes 74 which register with the screw 75. A helical spring 76 is secured at one end to the hub 35 of the worm gear 36, as at 78, and the opposite end is secured to the collar 73, as at 79. After the mechanism is assembled in the camera, the collar 73 is rotated in a clockwise direction, looking to the right Figure 5, and when sufficient tension has been created on the spring 76, the collar 73 is secured to the collar 70 by the screw 75. The spring 76 tends to rotate the worm gear together with the frame 16, screen 15, in a counter-clockwise direction Figure 1, to elevate the screen into operated position, or in register with the plate holder of the camera. When the frame 16 is rotated about the shaft 20 to lower the screen out of register with the plate holder, the spring 76 is wound up, or the tension thereof increased as the screen is lowered. The spring 76 accordingly aids in elevating the plate back to operated position.

We have found that this ruled screen operating mechanism can be conveniently installed in the regular process camera of the type referred to without disturbing the construction, or normal operation, of the camera, and have found in practice that no vibration whatever is transmitted to the camera during the operation of the screen holder.

What we claim is:

1. The combination of a camera, a screen holding frame pivotally mounted in the camera adjacent one side thereof, mechanism for rotating said frame about its pivot to bring the screen into and out of register with the optical system of the camera, said mechanism including gearing arranged in the camera and operable from the outside of the camera, said gearing normally preventing rotation of said frame about its pivot, and spring means yieldingly resisting rotation of said frame.

2. The combination of a camera, a shaft extending transversely of the camera adjacent the bottom thereof, and being secured thereto, a screen holding frame rotatably mounted upon said shaft and being in register with the plate holder of the camera when in vertical position, and being out of register with the plate holder when in horizontal position, a worm gear secured to the frame, a worm mounted within the camera and meshing with the worm gear, a coiled spring surrounding said transverse shaft and having one end secured thereto and the other end secured to the screen holding frame and tending to rotate said frame to vertical position, and means operable from the outside of the camera for effecting rotation of said worm.

3. The combination of a camera, a screen holding frame, and mechanism for moving said frame into and out of register with the plate holder of the camera, said mechanism including a shaft mounted in the lower portion of the camera and extending transversely thereof through the lower end of said frame, a worm gear secured to the frame and rotatable therewith about said shaft, means coacting with the shaft and said frame and tending to rotate said frame about the shaft to vertical position in register with the plate holder, a worm mounted within the camera and meshing with the worm gear, and means operable from the outside of the camera for effecting rotation of the worm.

4. The combination of a camera, a plate holder mounted in the rear box of the camera, a frame mounted in the rear box of the camera adjacent the plate holder and being adjustable toward and from the same, a screen holding frame pivotally mounted on said first mentioned frame, and means for moving said screen holding frame about its pivot to bring the screen into and out of register with the optical system of the camera, said mechanism including gearing arranged in the camera and operable from the outside thereof.

5. The combination of a camera, a plate holder detachably mounted in the rear box of the camera, a frame mounted within the rear box of the camera adjacent the plate holder and being adjustable toward and from the same, a screen carrying frame pivotally mounted upon said first mentioned frame, and mechanism operable from the outside of the camera for moving said screen holding frame into and out of register with the optical system of the camera, and means operable from the outside of the camera for adjusting said first mentioned frame relative to the plate holder.

6. The combination of a camera, a plate holder mounted in the rear box of the camera, a frame mounted in the rear box and being adjustable toward and from the plate holder, a screen holding frame pivotally mounted upon said first mentioned frame, and mechanism for moving said screen holding frame about its pivot to bring the screen into and out of register with the optical system of the camera, said mechanism including gearing carried in part by said first mentioned frame and in part by the rear box of the camera.

7. The combination of a camera, a plate holder detachably mounted in the rear box of the camera, a frame mounted in the rear box of the camera adjacent the plate holder and being adjustable toward and from the same, a shaft secured to the bottom of said frame and extending transversely of the camera, a screen holding frame pivotally mounted upon said shaft, a worm gear secured to said screen holding frame, a bracket secured to said first mentioned frame, a shaft pivotally mounted in said bracket and a worm rotatable with said shaft and meshing with the worm gear on the frame, a drive shaft rotatably mounted in the side of the camera, motion transmitting mechanism between said drive shaft and said worm shaft and operable to permit movement of said first frame toward and from the drive shaft, and means carried by the outer end of the drive shaft for manually operating the same from the outside of the camera.

8. The combination of a camera, a screen holding frame pivotally mounted in the camera adjacent one side thereof, said frame being pivoted at one of its sides to bring the screen into and out of register with the optical system of the camera during pivotal movement, a spring member operable to urge said frame into register with said optical system, means arranged within the camera and normally preventing pivotal movement of the frame and being operable from the outside of the camera to effect pivotal movement of the frame to move the screen into and out of register with the optical system of the camera.

9. The combination of a camera, a screen holding frame rotatably mounted in the camera on an axis extending adjacent one side of the frame and parallel to one side of the camera, said frame being rotatable about said axis from horizontal to vertical position, a screen carried by said frame and arranged in alinement with the optical system of the camera when said frame is in vertical position, means operable from the outside of the camera for rotating said frame about its axis, and spring means yieldingly resisting movement of said frame from vertical to horizontal position.

10. The combination of a camera, a plate holder mounted in the rear box of the camera, a frame mounted in the rear box of the camera adjacent the plate holder and being adjustable toward and from the same, a screen holding frame pivotally mounted on said first-mentioned frame, and means operable from the outside of the camera for moving said screen holding frame about its pivot to bring the screen into and out of register with the optical system of the camera.

WILLIAM DISQUE.
CHARLES E. SKELTON.